US008860329B2

(12) United States Patent
Wang

(10) Patent No.: US 8,860,329 B2
(45) Date of Patent: Oct. 14, 2014

(54) CONTROL CIRCUIT WITH FAST RECOVERY

(75) Inventor: Shu Wang, Saint Egreve (FR)

(73) Assignee: ST-Ericsson SA, Plan-les-Ouates (CH)

( * ) Notice: Subject to any disclaimer, the term of this patent is extended or adjusted under 35 U.S.C. 154(b) by 706 days.

(21) Appl. No.: 13/123,975

(22) PCT Filed: Sep. 17, 2009

(86) PCT No.: PCT/EP2009/062075
§ 371 (c)(1),
(2), (4) Date: Jul. 28, 2011

(87) PCT Pub. No.: WO2010/043466
PCT Pub. Date: Apr. 22, 2010

(65) Prior Publication Data
US 2011/0279060 A1 Nov. 17, 2011

(30) Foreign Application Priority Data

Oct. 14, 2008 (EP) .................................... 08305683

(51) Int. Cl.
*H05B 37/02* (2006.01)
*G05F 1/10* (2006.01)
*H02M 3/156* (2006.01)
*H02M 3/157* (2006.01)
*H02M 1/00* (2006.01)

(52) U.S. Cl.
CPC ...... *H02M 3/157* (2013.01); *H02M 2001/0012* (2013.01); *H02M 3/156* (2013.01)
USPC ............ 315/297; 315/291; 323/282; 323/283

(58) Field of Classification Search
USPC .......... 315/291, 294, 297, 312, 307; 323/282, 323/283
See application file for complete search history.

(56) References Cited

U.S. PATENT DOCUMENTS 6,281,665 B1 * 8/2001 Miyaba et al. ................ 323/224
2006/0033482 A1 2/2006 Florence et al.
(Continued)

FOREIGN PATENT DOCUMENTS

EP 1953906 A 8/2008
JP 4-308459 A 10/1992
(Continued)

OTHER PUBLICATIONS

International Search Report for PCT/EP2009/062075 mailed Oct. 22, 2009.

(Continued)

*Primary Examiner* — Douglas W Owens
*Assistant Examiner* — Jonathan Cooper
(74) *Attorney, Agent, or Firm* — Patent Portfolio Builders PLLC

(57) ABSTRACT

The invention concerns a control circuit arranged to generate a control signal ($V_c$) for controlling at least one transistor of a switched mode power supply (SMPS, 102) during first, second and third successive time periods based on a feedback voltage ($V_F$), wherein during the first and third time periods the control circuit is adapted to regulate the output voltage of the SMPS to a first voltage level, and during the second time period the control circuit is adapted to control the SMPS to output a low voltage, the control circuit having a memory (304) adapted to store an indication of the control signal generated by the control circuit at the end of the first time period, wherein the control circuit is adapted to output a control signal based on the stored indication at the start of the third time period.

13 Claims, 3 Drawing Sheets

(56) References Cited

U.S. PATENT DOCUMENTS

| | | | |
|---|---|---|---|
| 2006/0145670 A1* | 7/2006 | Zhou et al. | 323/222 |
| 2008/0106216 A1* | 5/2008 | Yu et al. | 315/247 |
| 2008/0224633 A1* | 9/2008 | Melanson et al. | 315/292 |

FOREIGN PATENT DOCUMENTS

| | | |
|---|---|---|
| JP | 2000-56634 A | 2/2000 |
| JP | 2006-50894 A | 2/2006 |
| JP | 2008-522564 A | 6/2008 |
| WO | 2006/037214 A1 | 4/2006 |

OTHER PUBLICATIONS

Wang, S., et al., "Design and Implementation of a High Switching Frequency Digital Controlling SMPS," Power Electronics Specialists Conference, 2007, PESC 2007, IEEE, Piscataway, NJ, Jun. 17, 2007, pp. 219-223, XP031218294.

Prodic, A., et al., "Design of a Digital PID Regulator based on look-up tables for control of high-frequency DC-DC converters," IEEE Workshop on Computers in Power Electronics, Jun. 3, 2002, pp. 18-22, XP002444875.

Japanese Office Action in corresponding Japanese Application No. 2011-531426 mailed Sep. 6, 2013.

Partial translation of Japanese Application No. 2000-056634A.

* cited by examiner

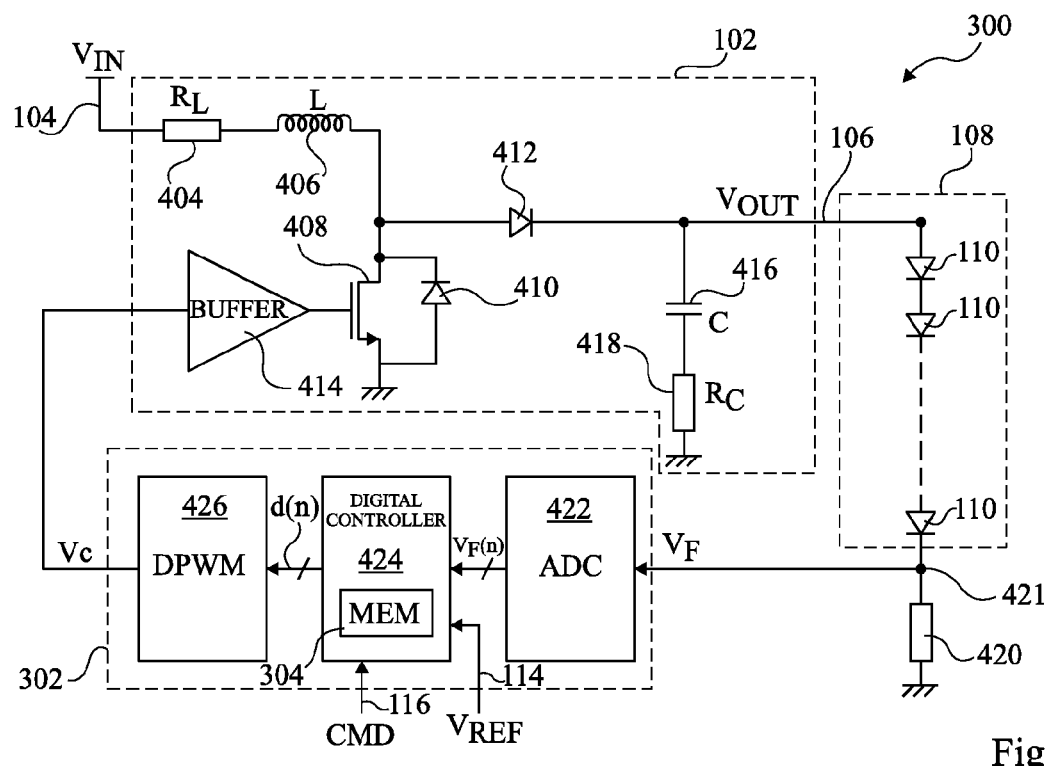
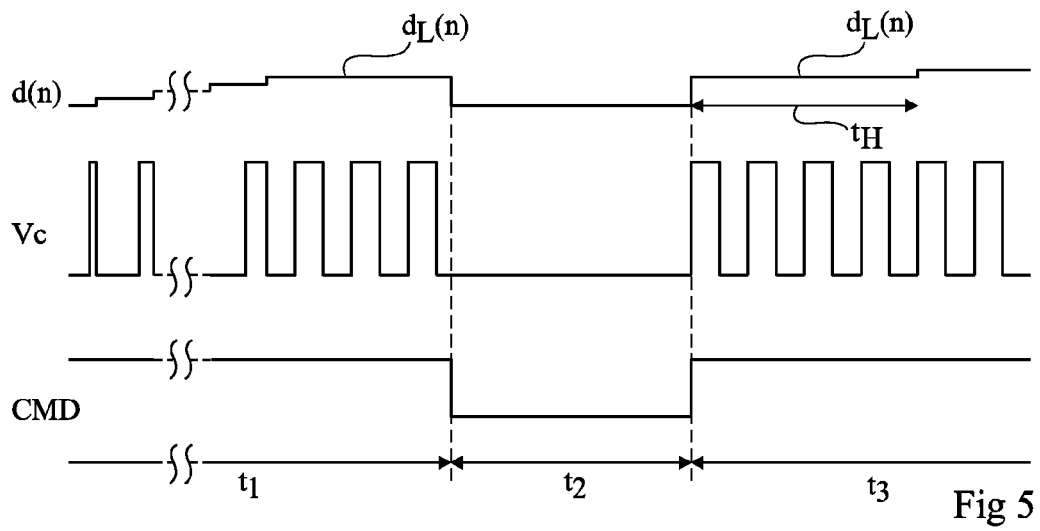
Fig 5
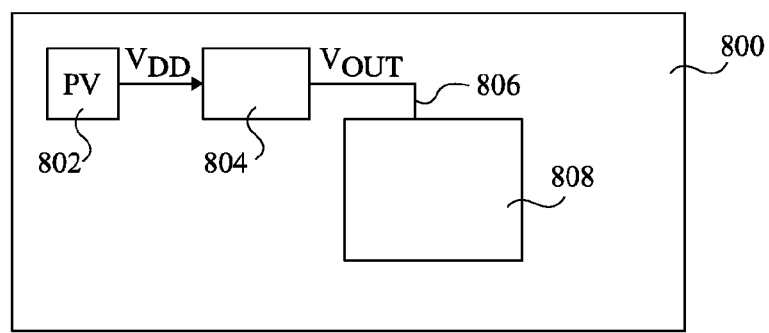
Fig 8

US 8,860,329 B2

CONTROL CIRCUIT WITH FAST RECOVERY

FIELD OF THE INVENTION

The present invention relates to a control circuit for controlling the output voltage of a DC-DC voltage converter, and in particular to control circuit for generating a control signal to a DC switched-mode power supply (SMPS).

BACKGROUND OF THE INVENTION

DC switched mode power supplies (SMPS) are used to convert the supply voltage of a circuit into a different DC voltage level. The output voltage of the DC-DC converter may be lower than the input voltage (for example in the case of a buck converter), it may be higher than the input voltage (for example in the case of a boost converter) or it may be either higher or lower (for example in the case of a buck-boost converter). Such circuits comprise a switching transistor, and the output voltage of these circuits is controlled by the duty cycle of the switching transistor.

In order to regulate the duty cycle of the switching transistor, and thus the output voltage, both analogue and digital control circuits have been proposed. Digital control circuits have the advantage over analogue control circuits of using less chip surface area, and are thus the preferred solution in many applications such as laptops, mobile phones, digital cameras etc.

A problem with known digital control circuits is that they are generally inefficient in terms of their power consumption.

SUMMARY OF THE INVENTION

Embodiments of the present invention aim to at least partially overcome one or more problems in the prior art.

According to one aspect of the present invention, there is provided a control circuit arranged to generate a control signal for controlling at least one transistor of a switched mode power supply during first, second and third successive time periods based on a feedback voltage, wherein during the first and third time periods the control circuit is adapted to regulate the output voltage of the SMPS to a first voltage level, and during the second time period the control circuit is adapted to control the SMPS to output a low voltage, the control circuit comprising: a memory adapted to store an indication of the control signal generated by the control circuit at the end of the first time period, wherein the control circuit is adapted to output a control signal based on the stored indication at the start of the third time period.

According to one embodiment of the present invention, the control circuit is a digital control circuit and said indication of the control signal is a digital value.

According to a further embodiment of the present invention, said control signal is a PWM (pulse width modulation) signal, the duty cycle of which determines the output voltage of said switched mode power supply, and said indication of the control signal is a digital duty cycle value.

According to a further embodiment of the present invention, the control circuit comprises a digital controller adapted to output, on successive cycles, digital values; and a digital pulse width modulation block arranged to receive the digital values from the digital controller and to generate the control signal based on the digital values.

According to a further embodiment of the present invention, the control circuit is adapted to output a control signal based on the stored indication for N cycles of the digital controller at the start of the third time period, wherein N is equal to at least 2.

According to a further embodiment of the present invention, the digital controller comprises a further memory arranged to store an indication of the feedback voltage at the end of the first time period; and the control circuit is adapted to output a control signal based on the stored indication of the control signal at the start of the third time period until the feedback voltage reaches a determined value.

According to a further embodiment of the present invention, the control circuit further comprises a comparator arranged to compare the indication of the feedback voltage stored in the further memory with an indication of the feedback voltage during the third time period, wherein the control circuit is arranged to determine when the feedback voltage reaches the determined value based on the output of the comparator.

According to a further embodiment of the present invention, the digital controller is adapted to determine the digital values based on a control algorithm using one or more of lookup tables; dithering control; and fuzzy logic.

According to a further embodiment of the present invention, the control circuit further comprises a buffer coupled to the memory and arranged to output the digital values.

According to a further aspect of the present invention, there is provided a DC-DC voltage converter comprising the above control circuit and a switched mode power supply coupled to the control circuit.

According to a further embodiment of the present invention, the switched mode power supply is one of: a buck converter; a boost converter; and a buck-boost converter.

According to a further aspect of the present invention, there is provided an electronic device comprising a power supply unit arranged to generate a supply voltage and the above DC-DC voltage converter arranged to convert the DC supply voltage to a voltage level different to the level of the supply voltage.

According to a further embodiment of the present invention, the DC-DC voltage converter is arranged to drive at least one light emitting diode.

According to a further aspect of the present invention, there is provided a method of generating a control signal for controlling at least one transistor of a switched mode power supply during first, second and third successive time periods based on a feedback voltage, wherein during the first and third time periods the control circuit is adapted to regulate the output voltage of the SMPS to a first voltage level, and during the second time period the control circuit is adapted to control the SMPS to output a low voltage, the method comprising: storing in a memory an indication of the control signal generated by the control circuit at the end of the first time period; and outputting a control signal based on the indication stored in the memory at the start of the third time period.

According to a further embodiment of the present invention, the method further comprises receiving a command signal indicating the timing of the first, second and third time periods.

According to a further embodiment of the present invention, the method further comprises, during the first and third time periods, generating by a digital controller on successive cycles digital values, the control signal being generated by a digital pulse width modulation block based on the digital values, wherein the control signal based on the indication stored in the memory is output at the start of the third time period for a plurality of cycles of the digital controller.

According to a further embodiment of the present invention, the method further comprises storing in a further memory an indication of the feedback voltage at the end of the first time period; comparing by a comparator an indication of the feedback voltage during the third time period and the stored indication of the feedback voltage, wherein the control signal based on the indication stored in the memory is output at the start of the third time period until the result of the comparison reaches a determined value.

BRIEF DESCRIPTION OF THE DRAWINGS

The foregoing and other purposes, features, aspects and advantages of the invention will become apparent from the following detailed description of embodiments, given by way of illustration and not limitation with reference to the accompanying drawings, in which:

FIG. 4 illustrates schematically the DC-DC voltage converter of FIG. 3 in more detail according to an embodiment of the present invention;

FIG. 5 shows timing diagrams of signals of the DC-DC converter of FIG. 4 according to embodiments of the present invention;

FIG. 8 illustrates schematically an electronic device according to embodiments of the present invention.

Throughout the figures, like features have been labelled with like reference numerals.

DETAILED DESCRIPTION OF THE INVENTION

Figure 1:
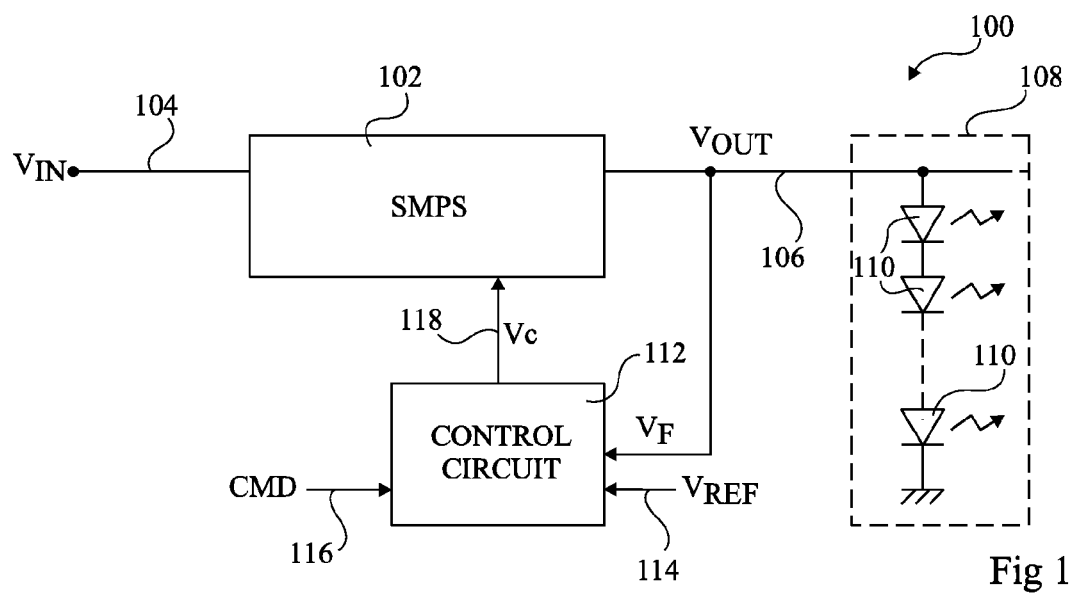
FIG. 1 illustrates schematically an example of a DC-DC voltage converter.

FIG. 1 illustrates schematically an example of a DC-DC voltage converter 100. DC-DC converter 100 comprises a switched-mode power supply (SMPS) 102 coupled to an input line 104 for receiving an input voltage $V_{IN}$, and to an output line 106 for providing an output voltage $V_{OUT}$.

Output voltage $V_{OUT}$ drives a load 108, which in this example comprises a series of LEDs (light emitting diodes) 110 coupled between the output line 106 and ground. The output line 106 is also coupled to a control circuit 112, and the output voltage provides a feedback voltage $V_F$ to control circuit 112. Control circuit 112 receives a reference voltage $V_{REF}$ on an input line 114, and a command signal (CMD) on an input line 116. Based on signals $V_F$, $V_{REF}$ and CMD, the control circuit 112 generates a control signal $V_C$, which is provided on a line 118 to control the SMPS 102. In particular, control signal $V_C$ controls one or more switches in SMPS 102 to adjust the output voltage $V_{OUT}$.

Certain types of loads may be designed to be driven by the DC-DC converter 100 periodically. For example, the LEDs 110 may be controlled to flash ON and OFF in order to reduce their brightness, and by controlling the duty cycle of the ON periods, the brightness of the LEDs can be adjusted. Thus the voltage $V_{OUT}$ can be in the form of a square wave having a frequency of for example around 100 Hz such that the flashing of the LEDs is not noticeable to the human eye.

The command signal CMD in FIG. 1 is used to activate or deactivate the control circuit 112, and thus alternate the output voltage $V_{OUT}$ of SMPS 102 between high and low values.

Figure 2:
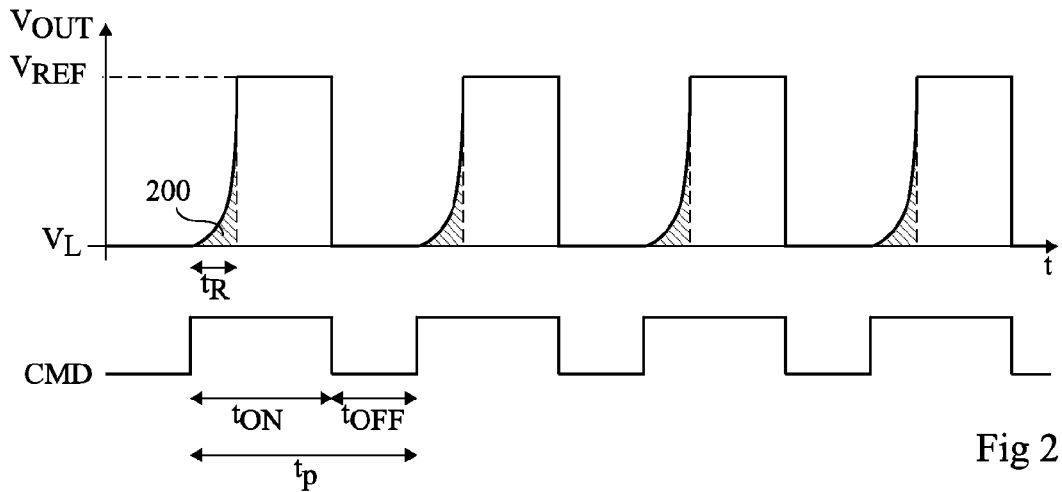
FIG. 2 shows an example of timing diagrams of an output voltage and a command signal of the DC-DC converter of FIG. 1.

FIG. 2 shows timing diagrams for the command signal CMD and the output voltage $V_{OUT}$, according to one example. Command signal CMD is a square wave having a period $t_P$, each period comprising a high pulse of duration $t_{ON}$, and a low pulse of duration $t_{OFF}$. During the high pulses, the output voltage $V_{OUT}$ of the DC-DC converter 100 is controlled to equal the reference voltage $V_{REF}$. In particular, the control circuit 112 is activated to regulate the output voltage such that the feedback voltage $V_F$ is equal to the reference voltage $V_{REF}$. During the low pulses the output voltage $V_{OUT}$ of the DC-DC converter falls to a low level $V_L$, which is for example at ground. In particular, the control circuit 112 is deactivated such that a constant low voltage is output to SMPS 102, for example at ground.

As shown in FIG. 2, the output voltage $V_{OUT}$ of the SMPS drops quickly to $V_L$ at the start of the $t_{OFF}$ period. However, the output voltage $V_{OUT}$ is slow to rise again to $V_{REF}$ at the start of the next $t_{ON}$ period. The rise time is labelled $t_R$ in FIG. 2. This delay results from the number of cycles that the control circuit 112 needs in order to achieve the control signal $V_C$ on line 118 that corresponds to the desired output voltage. The control circuit for example uses dither control, lookup tables or fuzzy logic in order to determine the control signal $V_C$, and these control algorithms generally take tens or even hundreds of cycles to arrive at the correct level.

Until the output voltage reaches the desired level, the load does not operate as desired. For example, in the case of LEDs, until a certain voltage is reach they may not turn ON at all. Thus, the power output by the DC-DC converter 100 during the period $t_R$ is essentially wasted, leading to inefficiency.

Figure 3:
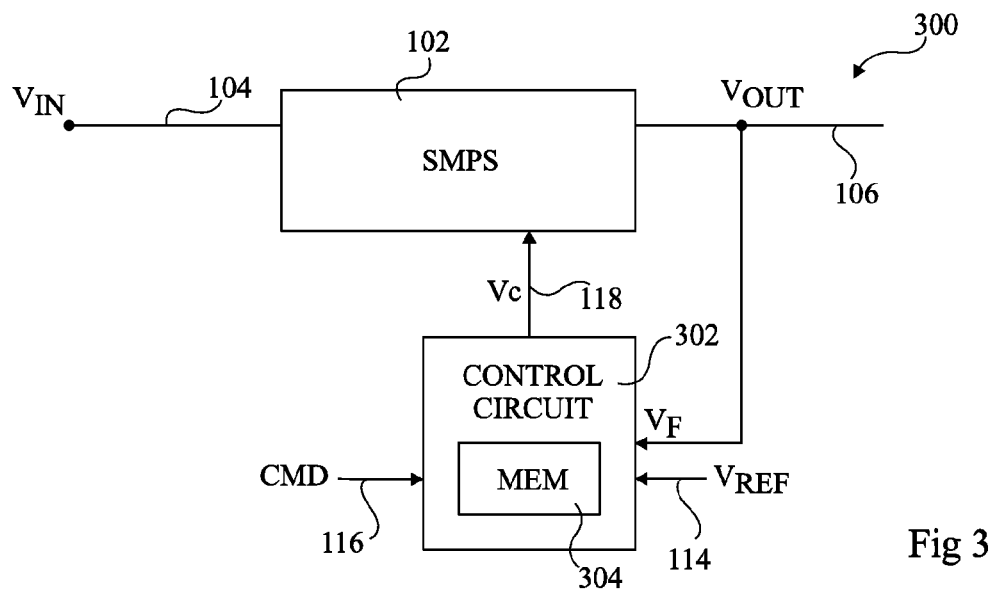
FIG. 3 illustrates schematically a DC-DC voltage converter according to an embodiment of the present invention.

FIG. 3 illustrates a DC-DC voltage converter 300. Elements of DC-DC converter 300 that are in common with the DC-DC converter 100 of FIG. 1 have been labelled with like reference numerals, and will not be described again in detail.

In the DC-DC voltage converter 300, the control circuit 112 has been replaced by a control circuit 302. Control circuit 302 receives the feedback voltage $V_F$, which in this example is the output voltage $V_{OUT}$ of the SMPS 102, but could be a different voltage in other embodiments. Control circuit 302 also receives the command signal CMD and the reference voltage $V_{REF}$, and outputs the control voltage $V_C$. One difference between control circuit 302 and control circuit 112 is that control circuit 302 comprises a memory 304, which is used to store an indication of the control signal $V_C$ generated by the control circuit 302 at the end of the $t_{ON}$ period of the command signal CMD. The value stored in memory 304 is then output by the control circuit 302 at the start of the subsequent $t_{ON}$ period of the command signal CMD, as will be explained in more detail below.

FIG. 4 illustrates the DC-DC converter 300 of FIG. 3 in more detail. The SMPS 102 in this example is a boost converter. SMPS 102 comprises a resistor 404 having one terminal coupled to the input line 104 and its other terminal coupled to one terminal of an inductor 406. Resistor 404 for example represents the resistance of the inductor 406, which is generally formed of a coil. The other terminal of the inductor 406 is coupled to a main current terminal of a transistor 408, which in this example is a MOS transistor, and to the cathode of a diode 410, which represents the internal junction of transistor 408. Diode 410 has its anode coupled to the other main current terminal of transistor 408, which is also coupled to ground. Transistor 408 has its gate node coupled to the output of a buffer 414. The inductor 406 is also coupled to the anode of a diode 412. The cathode of diode 412 is coupled to the output line 106 of the SMPS 102, and also to a capacitor 416 and a resistor 418 coupled in series between output line 106 and ground.

As with the example of FIG. 1, the load 108 in FIG. 4 comprises a series of diodes 110. In this example, rather than being coupled directly to ground, the load 108 is coupled to ground via a resistor 420, and the feedback voltage $V_F$ to the control circuit 302 is taken from a node 421 between resistor 420 and the load 108. Thus the feedback voltage $V_F$ in this example is based on the current through the load, which also passes through resistor 420. The reference voltage $V_{REF}$ in this example is equal to the desired voltage at node 421.

The control circuit 302 comprises an analogue to digital converter (ADC) 422 having an input coupled to node 421 for receiving the feedback voltage $V_F$. A digital controller 424 is coupled to the output of the ADC, and a digital pulse width modulation block (DPWM) 426 is coupled to the output of the digital controller 424.

ADC 422 converts the signal $V_F$ into digital form, and provides this as a digital signal $V_F(n)$ to the digital controller 424. The digital controller 424 generates a digital duty cycle signal d(n) based on $V_F(n)$ and the reference voltage $V_{REF}$, which it receives on an input line 114. The digital duty cycle signal d(n) is output to the DPWM block 426, and while the command signal CMD is high, the latest value of d(n) is also stored in memory 304. The DPWM block 426 outputs the control signal $V_C$ to buffer 414 of the SMPS 102.

Operation of the SMPS 102 of FIG. 4 will now be described.

While the command signal CMD is high, the control signal $V_C$ is a square wave having a duty cycle that determines the output voltage of the SMPS 102. During a first phase in which the control voltage $V_C$ is high, transistor 408 is controlled to be conducting. Thus, during the first phase, current flows from the input line 104 through the resistor 404, inductor 406 and transistor 408 to ground. During a second phase, the control signal $V_C$ goes low and transistor 408 is controlled to be non-conducting. Thus, during the second phase, current continues to flow through the inductor 406, but now flows through diode 412 to the output line 106 and the load 108. Charge is stored during the second phase on capacitor 416. At the end of the second phase, the first phase is repeated, during which current continues to be supplied to the load 108 by the charge stored on capacitor 416.

In order to regulate the output voltage level $V_{OUT}$, and thus the feedback voltage $V_F$, the control signal $V_C$ has a duty cycle D. The ratio of the output voltage $V_{OUT}$ to the input voltage $V_{IN}$ is approximately given by the following formula, assuming that the circuit is in a continuous mode of operation, implying that the current in the inductor never falls to zero, and ignoring resistances:

$$V_{OUT}/V_{IN}=1/(1-D)$$

D is the duty cycle as a value between 0 and 1, where 0 implies that the switch is never conducting, and 1 implies that the switch is always conducting. Thus the closer the duty cycle is to 1, the higher the output voltage. It should be noted that a duty cycle that remains very close or equal to 0 or 1 for a prolonged period is not desirable as this would result in a drop in the output voltage to a level below the input voltage.

Operation of the control circuit 302 of FIG. 4 will now be described with reference to timing diagrams of FIG. 5.

As shown in FIG. 5, during a first period $t_1$, the command signal is high. During this period, the ADC 422 samples the feedback voltage $V_F$ at determined time intervals, for example every 10 μs, and converts this voltage level into a digital value $V_F(n)$. The values $V_F(n)$ and $V_{REF}$ are for example each 12 bits and are provided to the digital controller 424. The digital controller 424 generates the digital duty cycle signal d(n) based on $V_F(n)$ and $V_{REF}$. There are various digital control techniques that can be used to generate d(n). For example, the control technique could include dithering, lookup tables, fuzzy logic, or a combination of these techniques. As an example, in FIG. 5, successive values of d(n) are shown converging up to a final value $d_L(n)$ during time period $t_1$. Based on the signal d(n), the DPWM block 426 generates the control signal $V_C$ having a corresponding duty cycle. As shown in FIG. 5, the duty cycle is shown increasing during the time period $t_1$ based on the rising values of d(n), and ending at a value corresponding to around 50 percent. While only a few periods of the signals d(n) and V are shown during time period t1 in FIG. 5, in practise there may be many more values of d(n) and periods of $V_C$.

During a time period $t_2$ straight after $t_1$, the command signal CMD is low. This results in the duty cycle value d(n) going low, and thus the control signal $V_C$ also goes low, and the output voltage $V_{OUT}$ of the DC-DC converter 300 will fall to a low value for example equal to the ground level. The last value $d_L(n)$ of the duty cycle signal d(n) is stored in memory 304 as soon as the signal CMD goes low. Alternatively, each new value of the duty cycle signal d(n) is continuously stored in memory 304 overwriting the previous value throughout the period $t_1$ that the signal CWD is high, such that when CMD goes low the value stored in memory 304 is the latest value $d_L(n)$.

During a time period $t_3$ straight after $t_2$, CMD is high again. Rather than new values of d(n) being generated, for a number of cycles N at the start of time period $t_3$, the last value $d_L(n)$ from memory 304 is output by the digital controller 424 to the DPWM block 426. As shown in FIG. 5, the value $d_L(n)$ is output for a hold period $t_H$, which for example has a duration of between 2 and several hundred cycles. This duration $t_H$ allows the output voltage of the SMPS 102 to stabilize before the normal control algorithm is applied by the digital controller 424. Due to the value of $d_L(n)$, the output voltage $V_{OUT}$ of the DC-DC converter 300 will quickly reach the value it had at the end of the $t_1$ period. After the hold period $t_H$, the digital controller 424 resumes operation by generating new values of d(n) based on the feedback voltage $V_F(n)$ and the reference voltage $V_{REF}$.

Figure 6:
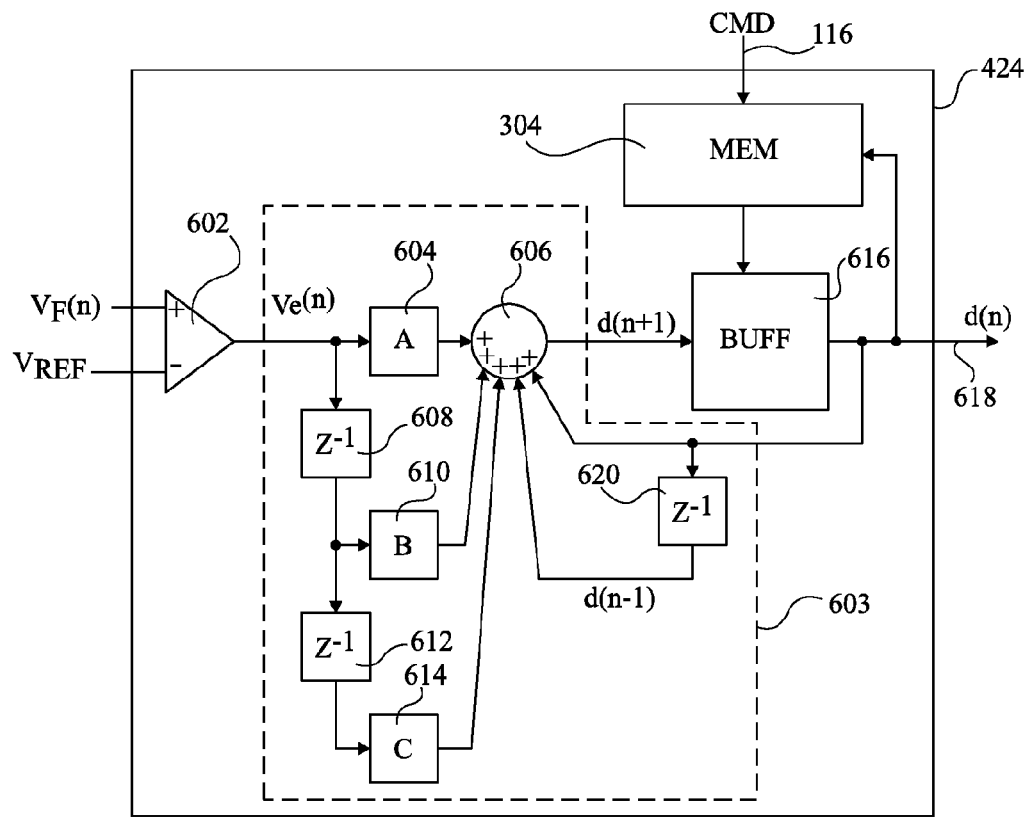
FIG. 6 illustrates schematically a digital controller of the DC-DC voltage converter of FIG. 4 in more detail according to an embodiment of the present invention.

FIG. 6 illustrates the digital controller 424 of FIG. 4 in more detail. In this example, the control technique used to generate the signal d(n) is based on lookup tables, although in alternative embodiments other techniques could be used.

A comparator 602 compares the feedback voltage $V_F(n)$ and the reference voltage $V_{REF}$, and provides an error signal $V_e(n)$ equal to $V_F(n)-V_{REF}$ indicating the error in the feedback signal. The error signal $V_e(n)$ is provided to a control algorithm block 603. Block 603 comprises a lookup table A 604, which receives the error signal $V_e(n)$, and has its output coupled to an adder 606. The error signal $V_e(n)$ is also provided to a delay block 608, which provides the delayed version of the error signal to a further lookup table B 610 and to a further delay block 612, which provides the twice delayed error signal to a further lookup table C 614. The outputs of lookup tables 610 and 614 are also provided to adder 606. The output of adder 606 is the next duty cycle value d(n+1), which is provided to a buffer 616. Buffer 616 provides the duty cycle signal d(n) on the following cycle, on an output line 618. The output line 618 is also provided as a further input to adder 606, and to a further delay element 620, which delays d(n) by one cycle, and outputs the delayed duty cycle signal d(n−1) as yet a further input to adder 606. The output of buffer 616 is also provided to memory 304. Memory 304 receives the command signal CMD on line 116.

Each table A, B, C comprises a series of possible input values, for example in the form of input ranges, and output values associated with each input value range.

Table A is directly connected to input 302, and generates an output α($V_e$(n)), this output being the value in look-up table A corresponding to the value of the input $V_e$(n). Table B generates an output β($V_e$(n−1)), this output being the value in look-up table B corresponding to the value of the input $V_e$(n−1).

Table C generates an output γ($V_e$(n−2)), this output being to the value in look-up table B corresponding to the value of the input $V_e$(n−2).

The transfer function of the control algorithm block 603 is thus:

$$d(n+1)=d(n)+d(n-1)+\alpha(V_e(n))+\beta(V_e(n-1))+\gamma(V_e(n-2))$$

The memory 304 operates by storing, when the command signal CMD goes low, the last value $d_L$(n) from the output of buffer 616. Then, memory 304 outputs a low value of d(n) to buffer 616, for example equal to all zeros. This low value of d(n) is then output from buffer 616 while the command signal CMD is low. When CMD next goes high, the stored last value $d_L$(n) is output from memory 304 to buffer 616, and this value is output from buffer 616 for a predetermined number of cycles N. N is for example between 2 and several hundred. N is chosen to be sufficiently high that there is very little or no risk of instability in the control loop. In particular, N should be chosen such that after N cycles the output voltage of the DC-DC converter is relatively close to the desired value, so that the digital controller is able to continue to regulate this value to the desired value.

The value of N could for example be stored in a memory (not illustrated), and a counter (also not illustrated) could be used to determine when N cycles have passed. After the Nth cycle after CMD goes high, the buffer is reset to receiving the values d(n+1) from adder 606, which are output one cycle later.

Figure 7:
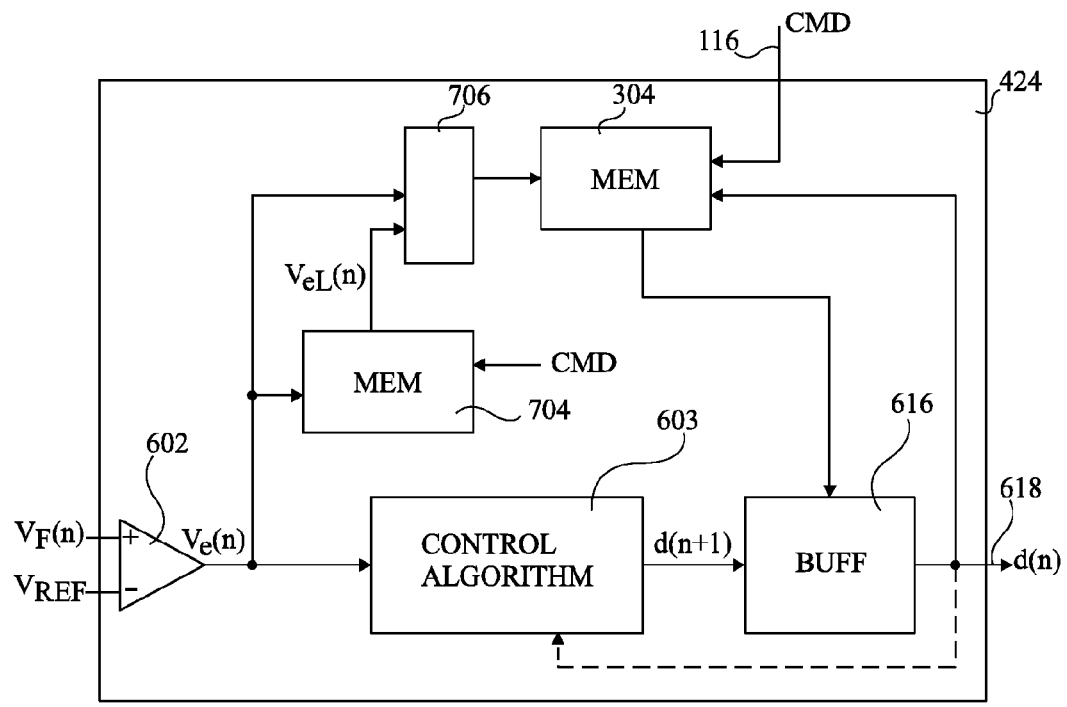
FIG. 7 illustrates schematically an alternative embodiment of the digital controller of FIG. 4 according to a further embodiment of the present invention.

FIG. 7 illustrates an alternative embodiment of the digital control 424 of FIG. 4.

In the digital controller 424 of FIG. 7, the control algorithm block 603 has not been shown in detail, and for example implements a control algorithm the same or different to the lookup tables used in the digital controller 424 of FIG. 6. The control algorithm block 603 of FIG. 7 may or may not receive the output of buffer 616 as an input.

In this embodiment, rather than being a predetermined number of cycles, the number of cycles N is determined based on the error signal $V_e$(n) from comparator 602. In particular, when the command signal CMD goes low, not only is the last value $d_L$(n) from buffer 616 stored in memory 304, but also the last value $V_{eL}$(n) of the error signal is also stored in a memory 704. Then, when the command signal CMD goes high again, the new values of the error signal $V_e$(n) are compared with the last value $V_{eL}$(n) of the error signal by a comparison block 706. Once the error signal $V_e$(n) becomes sufficiently close to the last value $V_{eL}$(n), for example to within a few values, an output signal is provided from the comparison block 706 to the memory 304, indicating that the control algorithm should be used again. The memory then resets buffer 616 so that the values of d(n+1) from the control algorithm block 603 are output on the output line 618. The number of cycles N is thus controlled based on the speed that the feedback signal returns to its level prior to the command signal CMD going low.

FIG. 8 illustrates an electronic device 800 comprising a power unit PU 802, which provides a supply voltage $V_{DD}$ to a DC-DC voltage converter 804, which is for example the converter 300 of FIG. 3, and comprises an SMPS which is for example a buck, boost or a buck boost converter. The output voltage $V_{OUT}$ on line 806 from the DC-DC converter 802 is provided to a load 808, which is for example any load that is supplied by a voltage different to $V_{DD}$.

The electronic device 800 is for example a laptop computer, mobile telephone, portable games console, media player, personal digital assistant (PDA), digital camera, or other device.

Thus a control circuit for controlling an SMPS has been described in which a memory is provided for storing an indication of the control signal prior to the control circuit being deactivated, and this value is output from the control circuit at the start of the next active period of the control circuit. This advantageously means that SMPS is able to return to the state it was in prior to deactivation of the control circuit very quickly.

Advantageously, according to some embodiments, the stored indication of the control signal is output by the control circuit for a determined number N of cycles, or until the voltage of the SMPS has reached a determined value. This advantageously ensures stability of the control loop.

Having thus described at least one illustrative embodiment of the invention, various alterations, modifications and improvements will readily occur to those skilled in the art.

For example, while embodiments been described in relation to a boost SMPS, alternatively the control circuit described herein could be used to control other types of SMPSs, such as buck converters or buck-boost converters.

Furthermore, while embodiments have been described in which the load of the DC-DC converter is a series of LEDs, in alternative embodiments the load could be any other type of load that may need to be switched ON and OFF regularly.

Furthermore, while embodiments have been described in which the feedback voltage $V_F$ provided to the control circuit is the output voltage $V_{OUT}$ or the voltage at a node 420 in FIG. 4, in alternative embodiments, the feedback voltage could be provided from an alternative node.

The invention claimed is:

1. A control circuit arranged to generate a control signal (Vc) for controlling at least one transistor of a switched mode power supply (SMPS) during first, second and third successive time periods (t1, t2, t3) based on a feedback voltage (VF), wherein during the first and third time periods the control circuit is adapted to regulate the output voltage of the SMPS to a first voltage level, and during the second time period the control circuit is adapted to control the SMPS to output a low voltage (VL), the control circuit comprising:

a memory adapted to store an indication (dL(n)) of the control signal generated by the control circuit at the end of the first time period (t1);

a digital controller adapted to output on successive cycles digital values (d(n)), wherein the digital controller comprises a further memory arranged to store an indication (Ve$_L$(n)) of the feedback voltage at the end of the first time period; and a digital pulse width modulation (DPWM) block arranged to receive the digital values (d(n)) from the digital controller and to generate said control signal based on said digital values, wherein the control circuit is adapted to output a control signal based on said stored indication of the control signal for N cycles of the digital controller at the start of the third time period until said feedback voltage reaches a determined value.

2. The control circuit of claim 1, wherein the control circuit is a digital control circuit and wherein said indication of the control signal is a digital value.

3. The control circuit of claim 1, wherein said control signal is a PWM (pulse width modulation) signal, the duty cycle of which determines the output voltage of said switched mode power supply, and wherein said indication of the control signal is a digital duty cycle value.

4. The control circuit of claim 1, further comprising a comparator arranged to compare the indication of the feedback voltage stored in the further memory with an indication (VeL(n)) of the feedback voltage during the third time period, wherein the control circuit is arranged to determine when said feedback voltage reaches the determined value based on the output of said comparator.

5. The control circuit of claim 1, wherein said digital controller is adapted to determine said digital values based on a control algorithm using one or more of:
   lookup tables;
   dithering control; and
   fuzzy logic.

6. The control circuit of claim 1, further comprising:
   a buffer coupled to said memory and arranged to output said digital values (d(n)).

7. A DC-DC voltage converter comprising the control circuit of claim 1 and a switched mode power supply coupled to said control circuit.

8. The DC-DC voltage converter of claim 7, wherein the switched mode power supply is one of:
   a buck converter;
   a boost converter; and
   a buck-boost converter.

9. An electronic device comprising a power supply unit arranged to generate a supply voltage and the DC-DC voltage converter of claim 7 arranged to convert said DC supply voltage to a voltage level (VOUT) different to the level of the supply voltage.

10. The electronic device of claim 9, wherein said DC-DC voltage converter is arranged to drive at least one light emitting diode.

11. A method of generating a control signal (Vc) for controlling at least one transistor of a switched mode power supply (SMPS) during first, second and third successive time periods (t1, t2, t3) based on a feedback voltage (VF), wherein during the first and third time periods the control circuit is adapted to regulate the output voltage of the SMPS to a first voltage level, and during the second time period the control circuit is adapted to control the SMPS to output a low voltage (VL), the method comprising:
   during said first and third time periods, generating by a digital controller on successive cycles digital values (d(n)), said control signal being generated by a digital pulse width modulation block based on said digital values;
   storing in a memory an indication (dL(n)) of the control signal generated by the control circuit at the end of the first time period (t1);
   storing in a further memory an indication (Ve$_L$(n)) of the feedback voltage at the end of the first time period; and
   outputting a control signal based on said indication stored in said memory at the start of the third time period for a plurality of cycles of the digital controller until said feedback voltage reaches a determined value.

12. The method of claim 11, further comprising receiving a command signal (CMD) indicating the timing of said first, second and third time periods.

13. The method of claim 11, further comprising:
   comparing by a comparator an indication (VeL(n)) of the feedback voltage during the third time period and the stored indication of the feedback voltage, wherein the control signal based on said indication stored in said memory is output at the start of the third time period until the result of said comparison reaches a determined value.

* * * * *